(12) United States Patent
Loayza

(10) Patent No.: US 8,599,535 B2
(45) Date of Patent: Dec. 3, 2013

(54) SYSTEM AND APPARATUS FOR MANAGING AND ORGANIZING ELECTRICAL CORDS AND CABLES

(76) Inventor: Oscar G. Loayza, Sunny Isle Beach, FL (US)

( * ) Notice: Subject to any disclaimer, the term of this patent is extended or adjusted under 35 U.S.C. 154(b) by 660 days.

(21) Appl. No.: 12/684,245

(22) Filed: Jan. 8, 2010

(65) Prior Publication Data

US 2010/0172118 A1 Jul. 8, 2010

Related U.S. Application Data

(60) Provisional application No. 61/143,302, filed on Jan. 8, 2009, provisional application No. 61/254,348, filed on Oct. 23, 2009.

(51) Int. Cl.
*H02B 1/00* (2006.01)
*G06F 1/16* (2006.01)
*H05K 5/00* (2006.01)
*H02B 1/20* (2006.01)
*H01B 7/00* (2006.01)

(52) U.S. Cl.
USPC ...... 361/601; 361/679.02; 361/826; 174/135; 454/184

(58) Field of Classification Search
USPC ............ 361/826, 679.22, 600, 601, 602, 641, 361/679.01, 679.02, 679.23; 174/50, 135; 454/184
See application file for complete search history.

(56) References Cited

U.S. PATENT DOCUMENTS

| 6,628,886 | B2 * | 9/2003 | Sommer et al. ............... 385/147 |
| 7,816,602 | B2 * | 10/2010 | Landry et al. .................. 174/50 |
| 2004/0057223 | A1 * | 3/2004 | Hall ............................... 361/826 |

* cited by examiner

*Primary Examiner* — Hoa C Nguyen
*Assistant Examiner* — Binh Tran
(74) *Attorney, Agent, or Firm* — Nancy J. Flint, Esq.; Nancy J. Flint, Attorney At Law, P.A.

(57) ABSTRACT

The invention provides a modular mapping system and apparatus for organizing and enclosing one or more electrical cables or cords that originate from and are connected to separate electronic devices and appliances. The system and apparatus can be made of a suitable size to house one or more electrical devices whereby the individual electrical cables or cords can be connected to or plugged into the electrical device. The individual electrical cables or cords never exit the apparatus and the electrical device is concealed from view. Another embodiment of the invention provides an apparatus for organizing and concealing for easy transport the various electrical cables and cords of the AC adapter cables and/or peripheral devices of a computer. The system and apparatus comprises a body that securely folds around the cables or cords in a closed configuration. The cords/cables can be restrained using wrapping system units and/or Velcro® wraps.

15 Claims, 18 Drawing Sheets

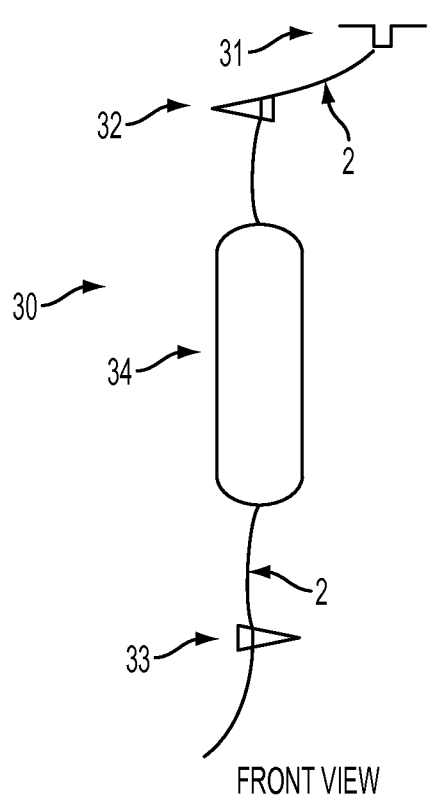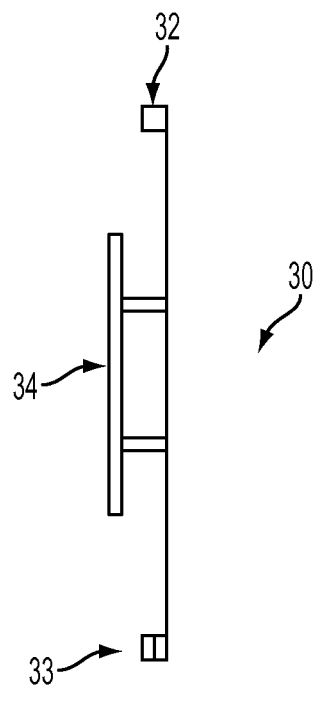
FRONT VIEW
FIG. 4a
SIDE VIEW
FIG. 4b

42 = RAIL

44 = HOOK

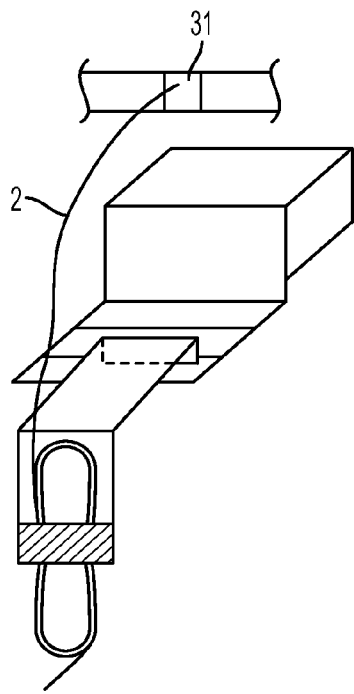
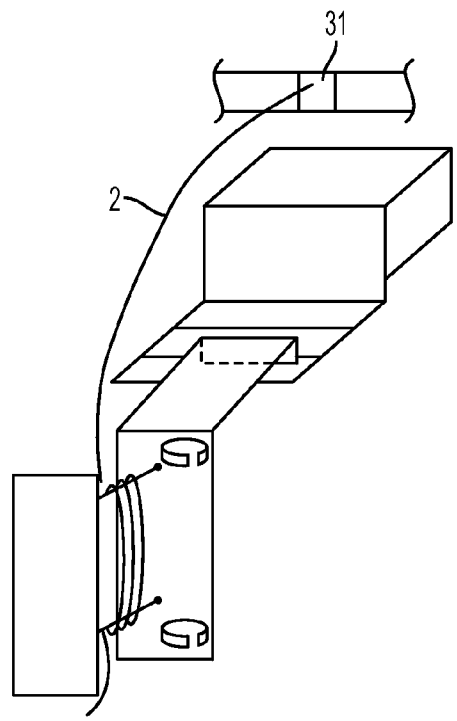
FIG. 9a    FIG. 10a
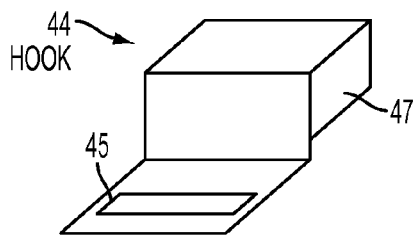
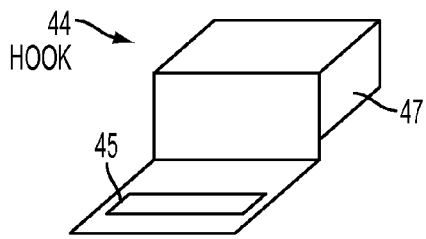
FIG. 9b    FIG. 10b
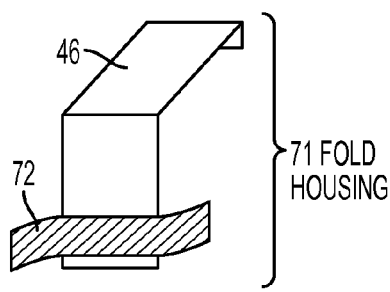
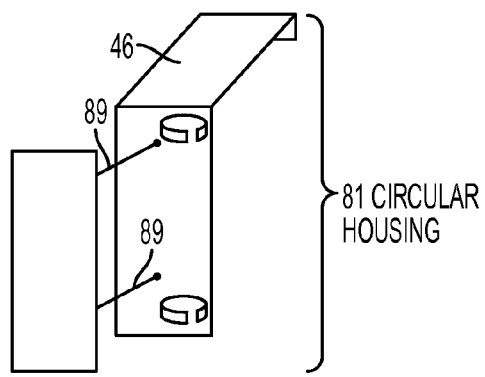
FIG. 9c    FIG. 10c

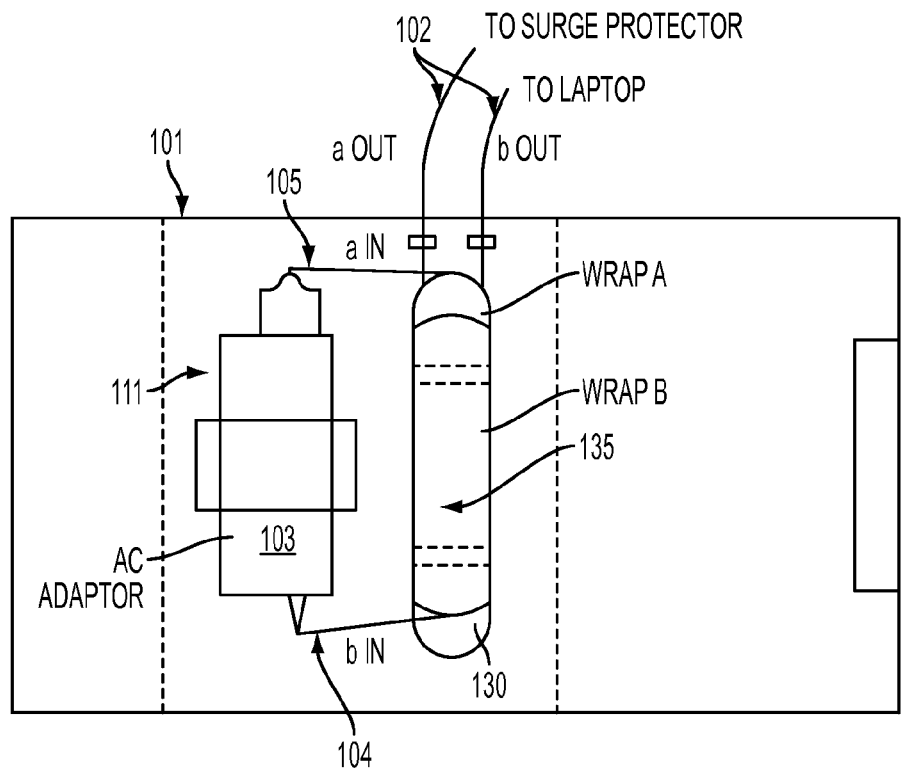
FIG. 15
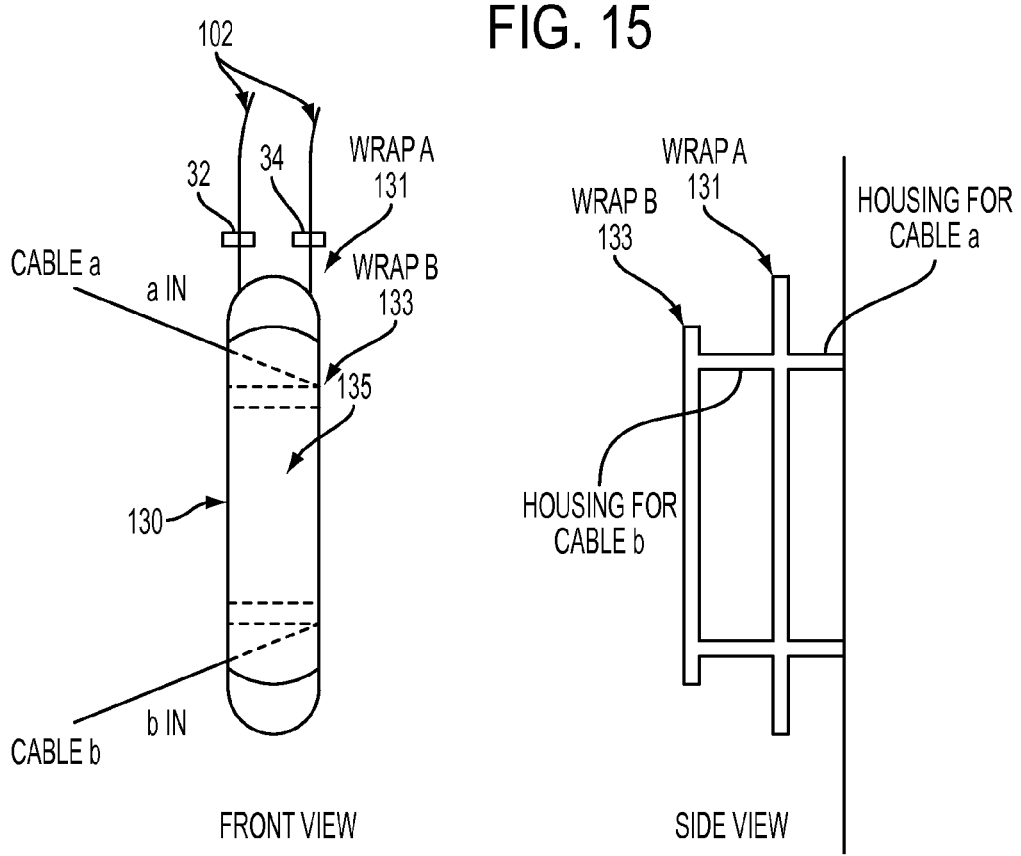
FRONT VIEW
FIG. 16a
SIDE VIEW
FIG. 16b

SYSTEM AND APPARATUS FOR MANAGING AND ORGANIZING ELECTRICAL CORDS AND CABLES

RELATED APPLICATIONS

This application claims the benefit of U.S. Provisional Patent Application Ser. No. 61/143,302 titled System and Apparatus For Managing and Organizing Electrical Cords and Cables, filed on Jan. 8, 2009 and also U.S. Provisional Patent Application Ser. No. 61/254,348 titled System and Apparatus For Managing and Organizing Electrical Cords and Cables, filed on May 29, 2009, the contents of which are herein incorporated by reference in their entireties.

FIELD OF THE INVENTION

This application relates generally to a system and apparatus for organizing and enclosing substantially from view one or more electrical cables or cords that originate from and are connected to separate electronic devices and appliances.

BACKGROUND OF THE INVENTION

The electrical cables or cords that connect electronic devices and appliances to a power source (e.g. an AC power outlet, a surge protector or power strip), a data source (e.g. a modem), or to another electronic device (e.g. an I/O peripheral computer device, a router, a mobile communications device, an iPod®, etc.) are typically a bold color and dangle from the electronic device or appliance and therefore, create an unsightly appearance. More importantly, the dangling cables or cords create a cumbersome and unsafe condition as they can easily become tangled on furniture articles, on a person's limbs or with other nearby cables or cords. Where there are several electrical devices adjacent to one another and are plugged into the same power source, data source or other electronic device, as is typical in an office or multimedia setting, it becomes increasingly difficult to manage the cables or cords such that the cable or cord from a particular device can easily be identified apart from the other cables or cords and can be prevented from becoming entangled with the other cables or cords. In addition, the structural and electrical integrity of the cable or cord is more easily damaged when it is left substantially exposed and dangling. Accordingly, there exists a need for a system and apparatus that can organize into a single unit a number of electrical cables or cords originating from separate electronic devices and appliances such that the cables or cords may be effectively shortened and substantially hidden from view.

In addition, it would be desirable for the container to also enclose the power or data source where practicable in order to simplify the structural features of the container, to conceal the unsightly appearance of the power or data source, and to ensure that the cables or cords do not have to also exit the container.

Therefore, an object of the present invention is to provide a container (or enclosure) that both encloses the power or data source where practicable and organizes, effectively shortens, and substantially conceals from view a number of electrical cables or cords that are plugged into the enclosed power or data source.

SUMMARY OF THE INVENTION

The invention provides a modular mapping system and apparatus for organizing into a single unit and enclosing substantially from view one or more electrical cables or cords that originate from and are connected to separate electronic devices and appliances. In addition, the system and apparatus can also be made of a suitable size and dimension to house one or more electrical devices whereby the individual electrical cables or cords can be connected to or plugged into the electrical device. For example, the electrical device could comprise a power strip, standard or more complex, larger-sized surge protector, cable modem, router, etc. Therefore, the individual electrical cables or cords advantageously never exit the apparatus and the electrical device is also concealed from view.

A wide variety of electrical cables or cords may be organized and concealed from view by the system and apparatus, including but not limited to, power cables and data cables connected to computer equipment, gaming system equipment, telecommunication devices, electronic household appliances, power strips, surge protectors, cable modems, routers, and home theater devices, etc. Furthermore, as described in detail below, the system and apparatus can be made of a suitable size and dimension to also secure and contain an AC adapter, voltage appliance controls or other components that are incorporated into various power cables or cords.

In one embodiment of the invention, the cables and cords are organized and restrained using wrapping system units whereby the user wraps the cables and cords around the housing of the wrapping system units to shorten them to a desirable and more manageable length. In one embodiment of the invention, a plurality of wrapping system units are mounted in the interior of the apparatus. In another embodiment of the invention, a rail is mounted in the interior of the apparatus and a plurality of cable and cord restraints are removably attached to the rail such that the plurality of restraints can be selected according to the type of cable or cord to be restrained or any other purpose. In one embodiment of the invention, several of the components of the apparatus are modular for accommodation of a variety of electrical devices and cables and cords. In one embodiment of the invention, the apparatus can be extended in size to hold one or more electrical devices of various sizes and shapes.

Another embodiment of the invention provides an apparatus for organizing and concealing for easy transport the various cables and cords of the AC adapter and/or peripheral devices (e.g. mouse, keyboard, audio/visual equipment) of a computer. In this embodiment, the system and apparatus comprises a body that is made of a substantially collapsible and flexible material that encloses the cables and cords by being securely folded around the cables or cords in a closed configuration. The cables and cords can be restrained using wrapping system units and/or Velcro® wraps.

DESCRIPTION OF THE DRAWINGS

The invention will be described with reference to the accompanying drawings, in which like elements are referenced with like numerals.

FIGS. 4a and 4b are a front view and a side view, respectively, of wrapping system units according to one embodiment of the invention.

FIGS. 9a, 9b and 9c are front perspective views of a restraint unit comprising a hook and a fold housing for restraining cables and cords according to one embodiment of the invention.

FIGS. 10a, 10b and 10c are front perspective views of a restraint unit comprising a hook and a ring housing for restraining cables and cords according to one embodiment of the invention.

FIGS. 13 and 15 are top views of an apparatus for organizing and concealing for easy transport of the various cables and cords of the AC adapter cables and/or peripheral devices of a computer in its open position according to one embodiment of the invention.

FIGS. 16a and 16b are front and side views of a wrapping system for an apparatus for organizing and concealing for easy transport of the various cables and cords of the AC adapter cables and/or peripheral devices of a computer according to one embodiment of the invention.

DESCRIPTION OF THE INVENTION

The present invention provides a modular mapping system and apparatus for organizing into a single unit and enclosing substantially from view one or more electrical cables or cords that originate from and are connected to separate electronic devices and appliances. In addition, the system and apparatus can also be made of a suitable size and dimension to house one or more electrical devices whereby the individual electrical cables or cords can be connected to or plugged into the electrical devices. For example, the electrical devices could comprise a power strip, standard or more complex, larger-sized surge protector, cable modem, router, etc. Therefore, the individual electrical cables or cords advantageously never exit the apparatus and the electrical devices are also concealed from view.

A wide variety of electrical cables or cords may be organized and concealed from view by the system and apparatus, including but not limited to, power cables and data cables connected to computer equipment, gaming system equipment, telecommunication devices, electronic household appliances, power strips, surge protectors, cable modems, routers, and home theater devices, etc. Furthermore, as described in detail below, the system and apparatus can be made of a suitable size and dimension to also secure and contain an AC adapter, voltage appliance controls or other components that are incorporated into various power cables or cords.

Figure 1A:
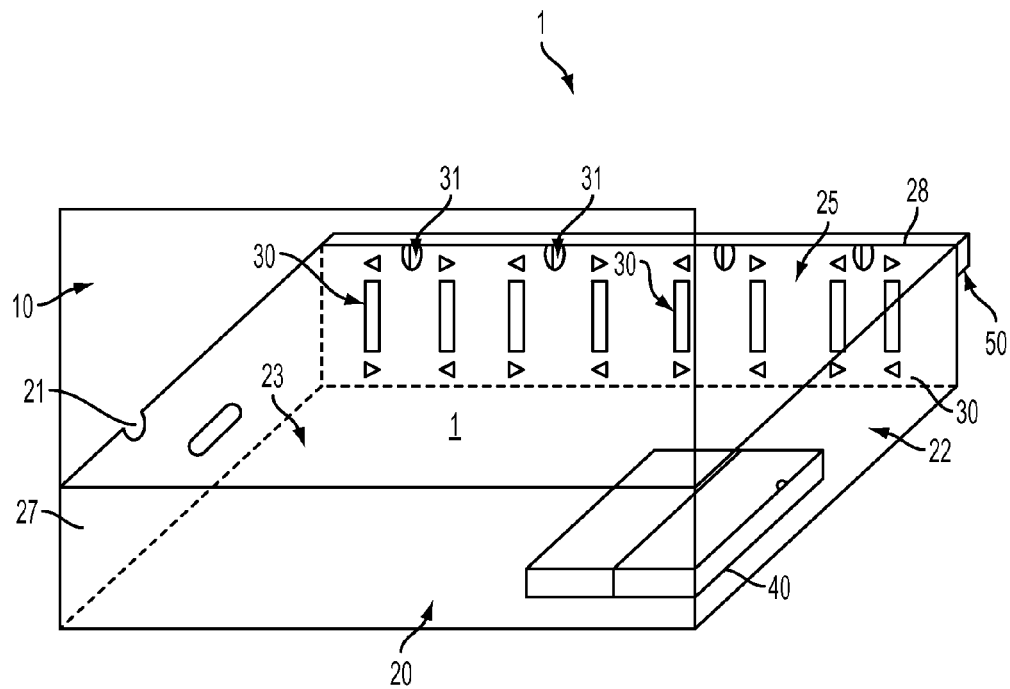
FIG. 1a is a front perspective view of an apparatus for managing and organizing cables and cords in an open position according to one embodiment of the invention.
Figure 5A:
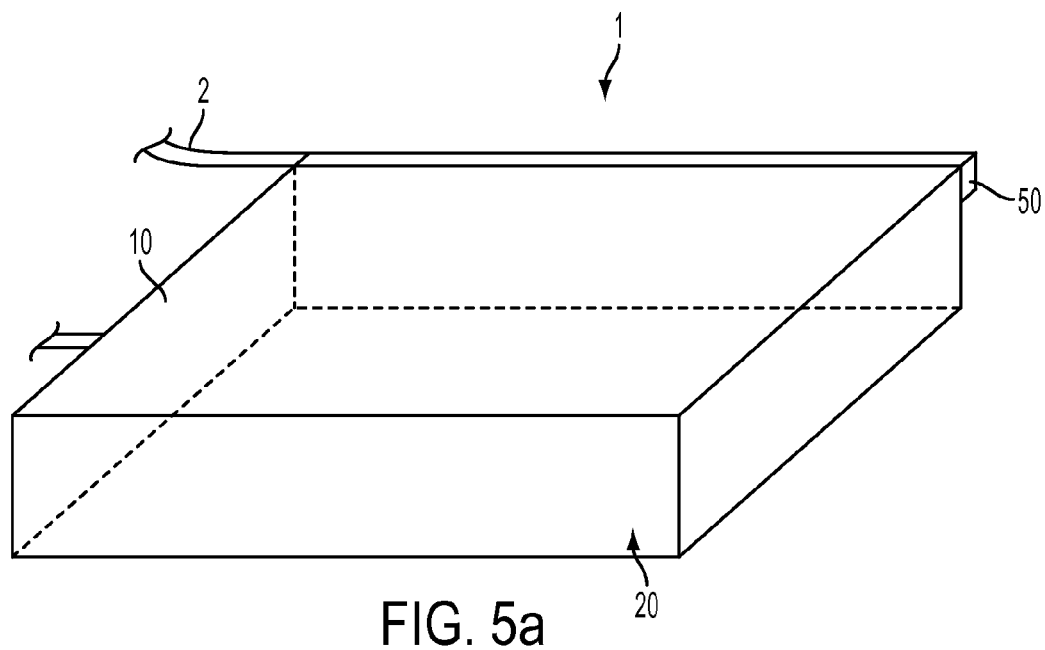
FIG. 5a is a front perspective view of an apparatus for managing and organizing cables and cords in a closed position according to one embodiment of the invention.

FIG. 1a depicts an embodiment of the present invention in an open configuration. The system and apparatus 1 comprises a body 20 and a top cover 10. As shown in FIG. 5a, the top cover 10 covers the body 20 thereby creating a box-like enclosure when the apparatus 1 is in a closed configuration.

The top cover 10 may be mechanically fastened to or attached to the body 20 such that the top cover 10 and the body 20 are a single unit whether in an open or closed configuration. The body 20 and top cover 10 may be comprised of any suitable material, including, but not limited to, nylon, plastic, aluminum or wood.

Figure 2A:
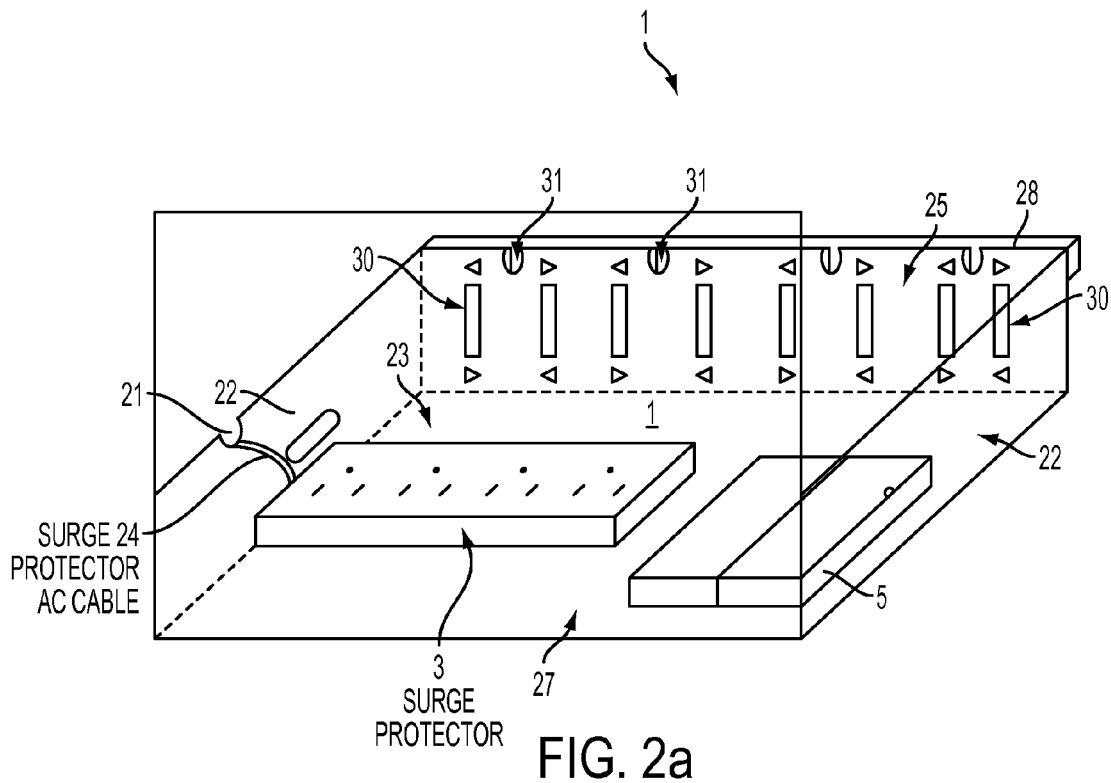
FIG. 2a is a front perspective view of an apparatus for managing and organizing cables and cords in an open position according to one embodiment of the invention.
Figure 3A:
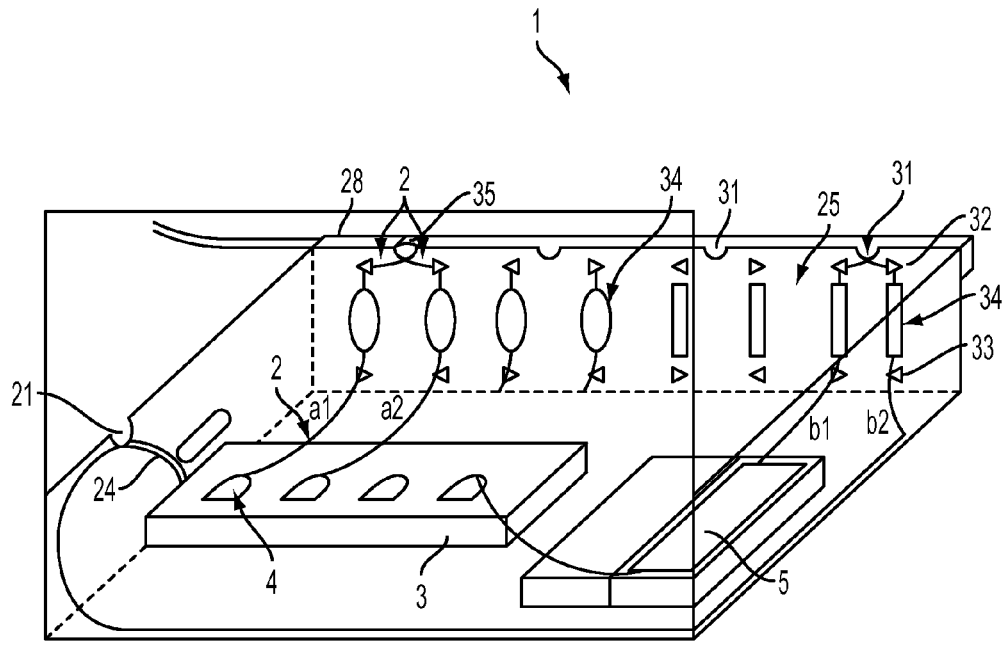
FIG. 3a is a front perspective view of an apparatus for managing and organizing cables and cords in an open position according to one embodiment of the invention.

Although the body 20 and top cover 10 of the apparatus 1 can be made in a variety of shapes and sizes, the body 20 is, in one disclosed embodiment, in the shape of a rectangle having a base 23 and four vertical side walls 22, including front wall 25 and back wall 27, whereby the base 23 and the side walls 22 form a container (or enclosure) of suitable size and dimension to contain the majority of the length of the one or more cables or cords 2 (as seen in FIG. 3a). As shown in FIG. 2a, the base 23 and the side walls 22 are also of suitable size and dimension to house electrical devices 3 and 5, such as a surge protector and/or A/C adaptor, whereby the one or more cables or cords 2 are connected or plugged into the electrical devices 3 and 5 (as seen in FIG. 3a). It is contemplated that the apparatus 1 may be made of various sizes and dimensions in order to house larger and/or more complex surge protectors than are currently available or in widespread use and to house the various cables that may be handled by such a surge protector unit. For example, a surge protector may incorporate not just standard AC electrical outlets, but may also include jacks or outlets for providing electrical protection for cable, telephone and broadband data line cables in a single surge protection unit.

Electrical devices 3 and 5 may be secured or otherwise attached to the base 23 of the body 20 in order to prevent electrical devices 3 and 5 from shifting around inside the body 20 during use. Various structural and fastening mechanisms can be used to hold electrical devices 3 and 5 in place. For example, Velcro® may be applied to the underside of electrical devices 3 and 5 and the base 23 of body 20. In another embodiment, a separate cordoned off compartment area or slot 40 may be formed in the base 23 of body 20 to further contain electrical devices 3 and 5 in place.

In operation, while the apparatus 1 is in an open configuration, the one or more individual cables or cords 2 are drawn into and enter the body 20 through one or more apertures 31 formed in the upper edge 28 of the one or more vertical side walls 22, for example front wall 25, as shown in FIG. 3a. Each aperture 31 may be apportioned to only a single cable or cord 2 in order to prevent the several cables or cords from becoming entangled with one another and to ensure that each cable or cord can be easily mapped to its corresponding electrical device and accessed by the user. In addition, as shown in FIG. 1a, a conduit 50 may be incorporated into the exterior surface of the body 20 at the upper edge 28 of front wall 25 for further managing and organizing the one or more cables or cords 2, which are first routed through the conduit 50 before entering the one or more apertures 31. Access to the conduit 50 may be provided through a small opening along the conduit or, in the alternative, the conduit 50 may be made to open and close vertically.

In order to maintain the organization of the electrical cables and cords once they are drawn into the body 20, one or more wrapping system units 30 may be provided along the inside surface of the one or more side walls 22, for example front wall 25, proximate to each of the apertures 31. As shown in detail in FIGS. 4a and 4b, wrapping system units 30 are generally comprised of housings 34 that protrude from and are removably attached to or slidingly engaged with side wall 22 whereby the user manually wraps the cable or cord 2 around one or more of the housings 34 such that the length of the cable or cord 2 may be effectively shortened to a desirable and more manageable length. Accordingly, the various cables or cords are effectively compartmentalized such that they do not become commingled inside the body 20 of the apparatus 1 as the majority of the length of each cable or cord is wrapped around a separate wrapping system unit(s) 30. As a result, a convenient mapping system is created whereby a user can easily locate and access a particular cable or cord. In one embodiment, there exists a one-to-one ratio between the number of possible cables or cords 2 that can be introduced into the body 20 of the apparatus and the number of wrapping system units 30 that are provided. However, where convenient or suitable, a single cable or cord may be wrapped around a set of adjacent wrapping system units 30. In addition, the shape and size, as well as the protruding distance between the wrapping system units 30 and the side wall 22 of the body 20, of the various wrapping system units 30 inside the apparatus 1 may vary in order to accommodate electrical cables or cords of different lengths and thicknesses.

In addition to the wrapping system units 30, each cable or cord 2 may be further secured to the inside of the body 20 by one or more locking protrusions 32 and 33 that compressibly engage the cable or cord 2 and hold it in place prior to and/or after the cable or cord is wrapped around the wrapping system units 30.

After the one or more cables or cords 2 are wrapped around wrapping system units 30 to the length desired by the user, the plug portion 4 of each cable or cord is preferably plugged into an electrical device 3 or 5, such as a surge protector, that is also enclosed in apparatus 1. In order to connect electrical device 3 or 5 to a power source, data source or other electrical device outside of apparatus 1, one or more apertures or tunnels 21 are provided for the cable or cord 24 of electrical device 3 or 5 to exit apparatus 1. In addition, one or more wrapping system units 30 may be placed proximate to exit aperture 21, for example on back wall 27 in order for cable or cord 24 of electrical devices 3 and 5 to be similarly wrapped and shortened as described above before exiting apparatus 1 (not shown).

Alternatively, where an electrical device 3 or 5 is not present, apparatus 1 may be used with cables or cords 2 that may exit the apparatus 1 at the exit aperture 21 after they are wrapped around one or more wrapping units 30 in order that they may be shortened to the desirable length and organized. Thereafter, the cables or cords 2 can be plugged into AC power receptacles located in a nearby wall or baseboard or a power strip, surge protector, cable modem, or router, etc. that is not enclosed inside apparatus 1.

As mentioned above, the body 20 of the apparatus 1 can be made of a suitable size and dimension to also secure and contain one or more of an AC adapter, voltage appliance control or other component that is incorporated into the midsection of various power cables or cords. For example, as depicted in FIGS. 1a and 2a, the body 20 of apparatus 1 can include an assigned and separate space, such as a compartment or slot 40, in which the AC adapter or other electrical device 3 or 5 is captured or contained in place after the corresponding cable or cord is wrapped around the wrapping system units 30. The incorporation of the compartment or slot 40 may be accomplished using a holding strip or other suitable mechanism. For example, the compartment or slot 40 may be delimited by two or more small vertical walls that can accommodate electrical devices 3 or 5, such as an AC adapter or other component of any length. The small vertical walls of compartment or slot 40 may be collapsible or removable in the event that the user does not use the compartment or slot 40 or for accommodating larger electrical devices 3 or 5, such as an AC adapter or other components. Alternatively, a Velcro® strap can be used to secure electrical devices 3 or 5, such as an AC adapter or other component, to the base 23 of the body 20. Electrical devices 3 and 5 may be placed in any orientation with respect to each other.

In order to accommodate the size of the electrical devices 3 or 5, such as an AC adapter or other component of the cable or cord 2, the conduit 50 may be eliminated entirely at the aperture 31 provided specifically for the cord or cable having an AC adapter or other component or, a separate and a larger conduit may be provided.

As illustrated in FIG. 5a, once each cable or cord 2 and electrical device 3 or 5 is set in place inside the body 20 as desired by the user, the top cover 10 is closed and the various cables or cords 2 and the electrical devices 3 and 5 are substantially hidden from view.

Furthermore, apparatus 1 may be adapted to be secured in place to a floor or connected to or hung on a wall, desk, or other type of furniture article.

Figure 1B:
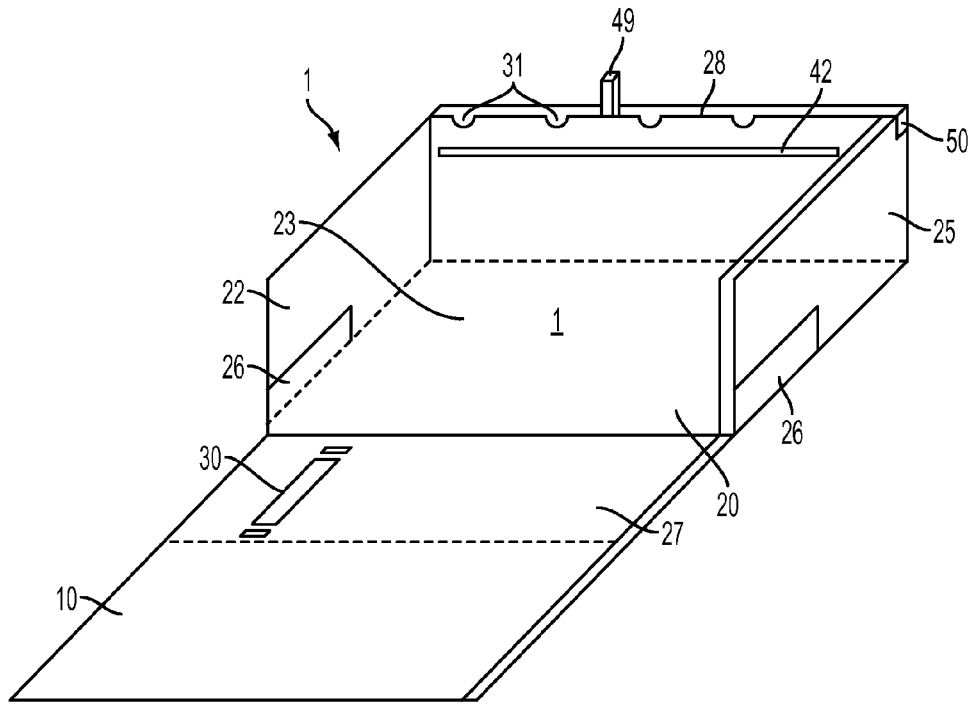
FIG. 1b is a front perspective view of an apparatus for managing and organizing cables and cords in an open position according to one embodiment of the invention.
Figure 5B:
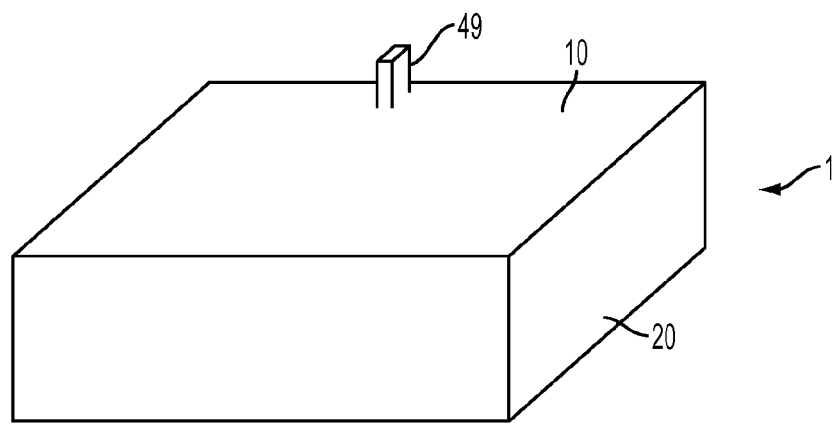
FIG. 5b is a front perspective view of an apparatus for managing and organizing cables and cords in a closed position according to one embodiment of the invention.

In another embodiment of the invention, a rail is mounted on the interior of apparatus 1 and a plurality of cable and cord restraint units can be removably attached to the rail such that the plurality of restraint units can be selected according to the type of cable or cord 2 to be restrained or any other purpose. FIG. 1b depicts one embodiment of this invention in an open configuration. The system and apparatus 1 comprises a body 20 and a top cover 10. As shown in FIG. 5b, the top cover 10 covers the body 20 thereby creating a box-like enclosure when the apparatus 1 is in a closed configuration. The top cover 10 may be mechanically fastened to or attached to the body 20 such that the top cover 10 and the body 20 are a single unit whether in an open or closed configuration. The body 20 and top cover 10 may be comprised of any suitable material, including, but not limited to, nylon, plastic, aluminum or wood.

Figure 2B:
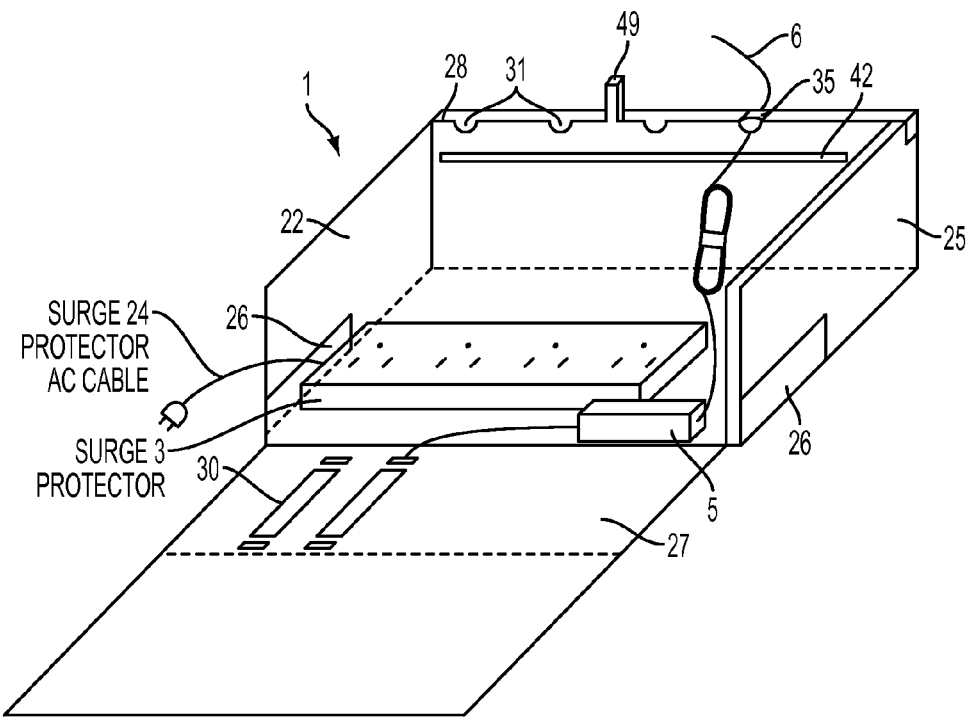
FIG. 2b is a front perspective view of an apparatus for managing and organizing cables and cords in an open position according to one embodiment of the invention.
Figure 3B:
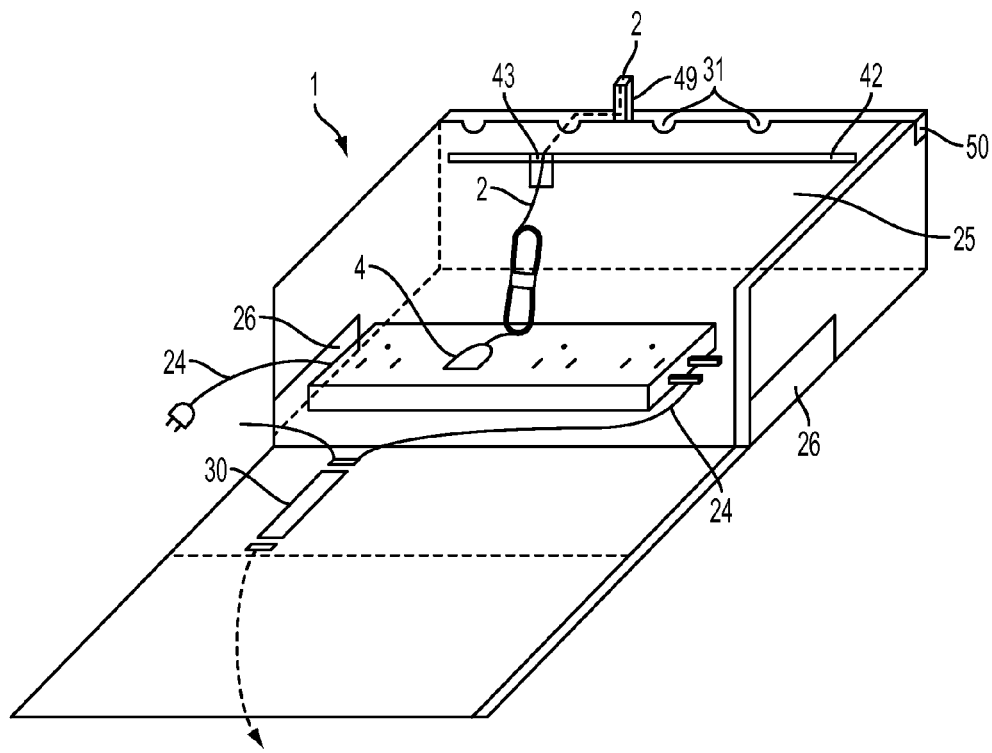
FIG. 3b is a front perspective view of an apparatus for managing and organizing cables and cords in an open position according to one embodiment of the invention.

Turning back to FIG. 1b, although the body 20 and top cover 10 of the apparatus 1 can be made in a variety of shapes and sizes, the body 20 is, in one disclosed embodiment, in the shape of a rectangle having a base 23 and four vertical side walls 22, including front wall 25 and back wall 27, whereby the base 23 and the side walls 22 form a container (or enclosure) of suitable size and dimension to contain the majority of the length of the one or more cables or cords 2 (as seen in FIG. 3b). As shown in FIG. 2b, the base 23 and the side walls 22 are also of suitable size and dimension to house one or more electrical devices 3 and 5, such as a surge protector and an A/C adaptor, whereby the one or more cables or cords 2 are connected or plugged into the electrical devices 3 and 5 (as seen in FIG. 3b). It is contemplated that apparatus 1 may be made of various sizes and dimensions in order to house larger and/or more complex surge protectors than are currently available or in widespread use and to house the various cables that may be handled by such a surge protector unit. For example, a surge protector may incorporate not just standard AC electrical outlets, but may also include jacks or outlets for providing electrical protection for cable, telephone and broadband data line cables in a single surge protection unit.

Electrical devices 3 and 5 may be secured or otherwise attached to the base 23 of body 20 in order to prevent electrical devices 3 and 5 from shifting around inside the body 20 during use. Various structural and fastening mechanisms can be used to hold electrical devices 3 and 5 in place. For example, Velcro® may be applied to the underside of electrical devices 3 and 5 and the base 23 of the body 20. In another embodiment, a separate cordoned off compartment area or slot may be formed in the base 23 of the body 20 to further contain electrical devices 3 and 5 in place.

In operation, while apparatus 1 is in an open configuration, the one or more individual electrical cables or cords 2 may be drawn into and enter the body 20 through one or more apertures 31 formed in the upper edge 28 of front wall 25, as shown in FIGS. 1b, 2b and 3b. Each aperture 31 may be apportioned to only a single electrical cable or cord 2 in order to prevent the several electrical cables or cords 2 from becoming entangled with one another and to ensure that each cable or cord can be easily mapped to its corresponding electrical device and accessed by the user. In addition, as shown in FIG. 1b, a conduit 50 may be incorporated into the upper edge 28 of body 20 at the upper edge 28 of front wall 25 for further managing and organizing the one or more cables or cords 2, which are first routed through the conduit 50 before entering the one or more apertures 31. Access to conduit 50 may be provided through a small opening along the conduit or, in the alternative, the conduit 50 may be made to open and close vertically. Alternatively, or in addition, an inlet port 49 may be located in the upper surface of the body 20 to allow access by cables and cords 2 to conduit 50.

Figure 6A:
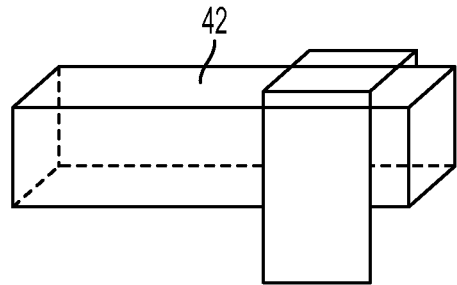
FIGS. 6a, 6b and 6c are front perspective views of a restraint unit for restraining cables and cords according to one embodiment of the invention.
Figure 6B:
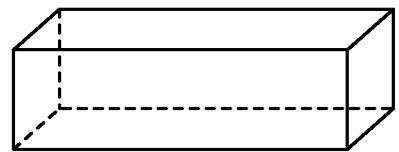
Figure 6C:
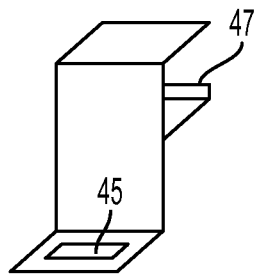
Figure 7A:
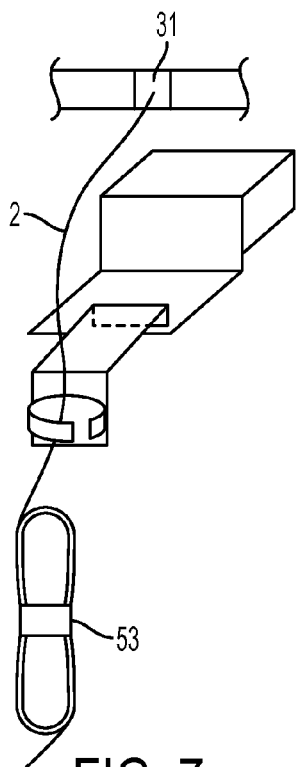
FIGS. 7a, 7b, 7c and 7d are front perspective views of a restraint unit comprising a hook and a clip housing for restraining cables and cords according to one embodiment of the invention.
Figure 8A:
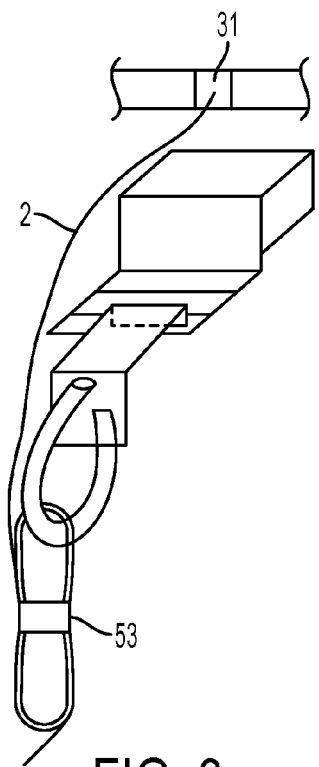
FIGS. 8a, 8b, 8c and 8d are front perspective views of a restraint unit comprising a hook and a loop housing for restraining cables and cords according to one embodiment of the invention.
Figure 7B:
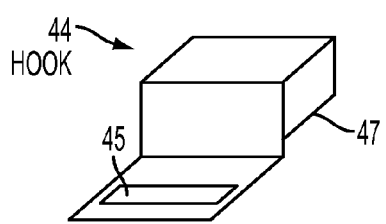
Figure 8B:
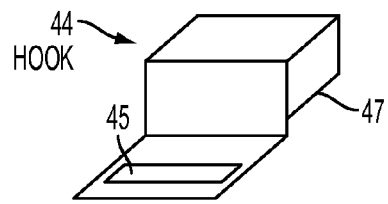
Figure 7C:
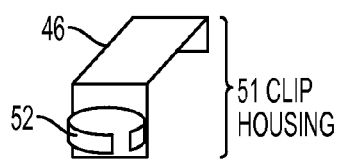
Figure 8C:
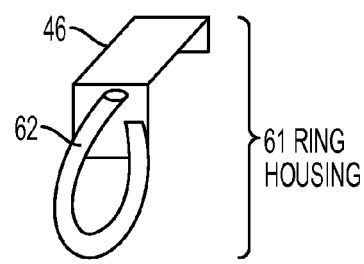
Figure 7D:
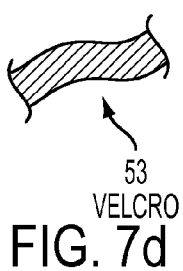
Figure 8D:
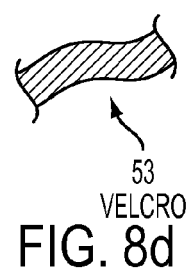
Figure 11A:
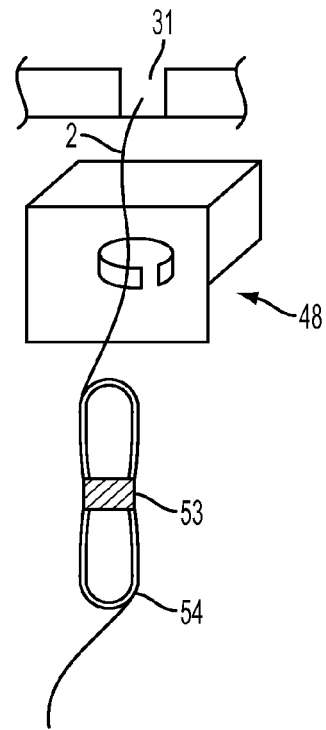
FIGS. 11a, 11b, 11c, 11d, 11e and 11f are front perspective views of restraint units comprising an integral hook and housing, such as a clip housing or a vertical loop housing, according to one embodiment of the invention.
Figure 11D:
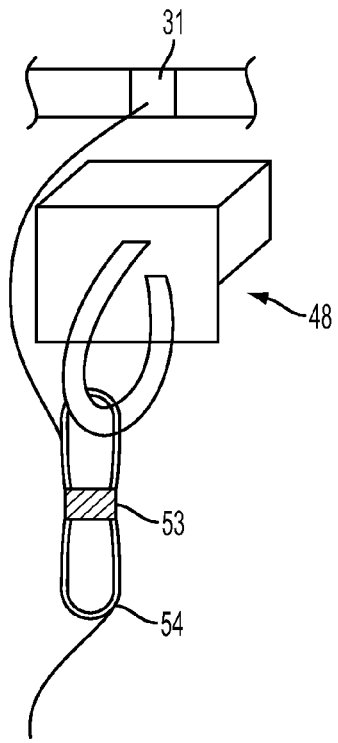
Figure 11B:
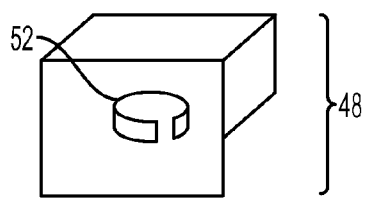
Figure 11E:
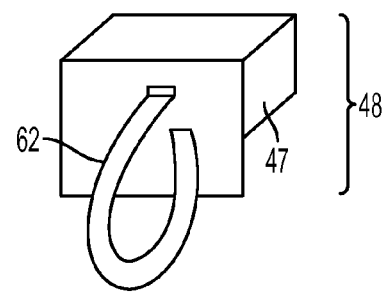
Figure 11C:
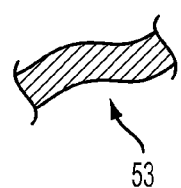
Figure 11F:
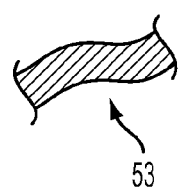

In order to maintain the organization of the cables and cords 2 once they are drawn into the body 20, a rail 42 may be provided along the inside surface of front wall 25 in close proximity to the apertures 31. Rail 42 is provided for one or more restraint units 43 to be releasably attached for restraining the cables and cords 2 that enter body 20 through apertures 31. Restraint units 43 (as seen in FIG. 6a-6c) may comprise a hook 44, a slot 45, a protuberance 47 and a housing for restraining cables or cords 2, such as a clip housing 51 as seen in FIGS. 7a-7d; a vertical loop housing 61 as seen in FIGS. 8a-8d; a fold housing 71 as seen in FIGS. 9a-9c; or a circular housing 81 as seen in FIGS. 10a-10c. Any combination of restraint units 43 can be used as desired. Further, restraint units 43 can be changed as desired. To attach restraint units 43 to rail 42, hook 44 may be sized to slide over rail 42 and the desired housing 51, 61, 71 or 81 is attached to slot 45 in hook 44. Protuberance 47 can be clipped to the underside of rail 42 to further secure restraint unit 43. Restraint units 43 are slid over rail 42 to the spot under the appropriate aperture 31 to restrain an incoming cord or cable 2. Restraint units 43 must be slid onto rail 42 in the order that they are to be situated under apertures 31. In other embodiments, rail 42 may comprise an upper lip and a lower lip (not shown) in which restraint units 43 may be configured to slide. In other embodiments, restraint units 43 may be clipped onto rail 42 at any time and in any order of placement, as desired by the user.

FIGS. 7-11 depict examples of restraint units 43. FIG. 7 depicts a restraint unit 43 comprising a hook 44 and a clip housing 51. Hook 44 comprises a slot 45 and protuberance 47 configured for attachment of arm 46 of clip housing 51. Hook 44 is configured to slide over rail 42. Clip housing 51 further comprises a clip 52 for directing incoming cable or cord 2. Incoming cable or cord 2 is then wrapped using Velcro® 53 after passing through clip housing 51. Although this embodiment is described as using Velcro® to wrap incoming cable or cord 2, this description is not intended to be limiting and any other suitable device or material now known or later developed may be used in place of Velcro®.

FIG. 8 depicts a restraint unit 43 comprising a hook 44 and vertical loop housing 61. Hook 44 comprises a slot 45 and protuberance 47 configured for attachment of arm 46 of vertical loop housing 61. Hook 44 is configured to slide over rail 42. Vertical loop housing 61 further comprises a vertical loop 62. Incoming cable or cord 2 is wrapped using Velcro® and the wrapped cable or cord 2 is held with vertical loop housing 61. Although this embodiment is described as using Velcro® to wrap incoming cable or cord 2, this description is not intended to be limiting and any other suitable device or material now known or later developed may be used in place of Velcro®.

FIG. 9 depicts a restraint unit 43 comprising a hook 44 and fold housing 71. Hook 44 comprises a slot 45 and protuberance 47 configured for attachment of arm 46 of fold housing 71. Hook 44 is configured to slide over rail 42. Fold housing 71 further comprises a Velcro®strip 72. Incoming cable or cord 2 is wrapped using Velcro® strip 72. Although this embodiment is described as using Velcro® to wrap incoming cable or cord 2, this description is not intended to be limiting and any other suitable device or material now known or later developed may be used in place of Velcro®.

FIG. 10 depicts a restraint unit 43 comprising a hook 44 and circular ring housing 81. Hook 44 comprises a slot 45 and protuberance 47 configured for attachment of arm 46 of circular ring housing 81. Hook 44 is configured to slide over rail 42. Circular ring housing 81 further comprises housings 89 that protrude from circular housing 81 whereby the user manually wraps the cable or cord 2 around one or more of the housings 89 such that the length of the cable or cord 2 may be effectively shortened to a desirable and more manageable length.

Referring to FIGS. 11a-11f, in one embodiment, restraint unit 43 comprises an integral hook 48 which comprises hook 44 and clip housing 51 or vertical loop housing 61 as a single unit. Integral hook 48 with clip housing 51 or vertical loop housing 61 is directly slidably and releasably attached to rail 42.

After the one or more cables or cords 2 are restrained by restraint units 43 and shortened to the length desired by the user, the plug portion 4 of each cable or cord is preferably plugged into an electrical device 3 or 5, such as a surge protector, that is also enclosed in apparatus 1. In order to connect electrical device 3 or 5 to a power source, data source or other electrical device outside of apparatus 1, one or more ingress and egress slots 26 are provided for the cable or cord 24 of electrical device 3 or 5 to exit apparatus 1. For example, cable or cord 24 of electrical devices 3 and 5 may include telephone lines and/or coaxial cables. In addition, as seen in FIGS. 1b, 2b and 3b, one or more wrapping system units 30, as previously described with respect to FIGS. 4a and 4b, may be placed proximate to the ingress and egress slot 26, for example on back wall 27, in order for cable or cord 24 to be similarly wrapped and shortened as described above before exiting the apparatus 1.

Alternatively, where a separate electrical device 3 or 5 is not present, cables or cords 2 may exit the apparatus 1 at the ingress and egress slots 26 after they are restrained by one or more restraint units 43 in order that they may be shortened to the desirable length and organized. Thereafter, cables or cords 2 can be plugged into AC power receptacles located in a nearby wall, baseboard, power strip, surge protector, cable modem, router, phone jack, etc. that is not enclosed inside apparatus 1.

As mentioned above, the body 20 of apparatus 1 can be made of a suitable size and dimension to also secure and contain an AC adapter, voltage appliance control or other component that is incorporated into the midsection of various power cables or cords. For example, the body 20 of apparatus 1 can include an assigned and separate space, such as a compartment or slot 40 (not shown), in which the electrical devices 3 or 5, such as an AC adapter or other component, are captured or contained in place after the corresponding cable or cord is wrapped around the wrapping system unit(s) 30. The incorporation of compartment or slot 40 may be accomplished using a holding strip or other suitable mechanism. For example, compartment or slot 40 may be delimited by two or more small vertical walls that can accommodate an electrical device 3 or 5, such as an AC adapter or other component of any length. The small vertical walls of compartment or slot 40 may be collapsible or removable in the event that the user does not use compartment or slot 40 or for accommodating larger AC adapters or other electrical devices 3 or 5. Alternatively, a Velcro® strap can be used to secure electrical devices 3 or 5, such as an AC adapter or other component, to base 23 of body 20. Electrical devices 3 and 5 may be placed in any orientation with respect to each other. In another embodiment, electrical devices 3 and 5 can be positioned as desired by the user and secured to base 23 of body 20 by any fastening means, such as Velcro® or straps.

In order to accommodate the size of the AC adapter or other component 6 of cable or cord 2, the conduit 50 may be eliminated entirely at the aperture 31 provided specifically for the cord or cable having an AC adapter or other component or, a separate and larger conduit 35, as seen in FIG. 2b, may be provided.

As illustrated in FIG. 5b, once each cable or cord and electrical device is set in place inside the body 20 as desired by the user, the top cover 10 is closed and the various cables or cords and the electrical device are substantially hidden from view.

Figure 12A:
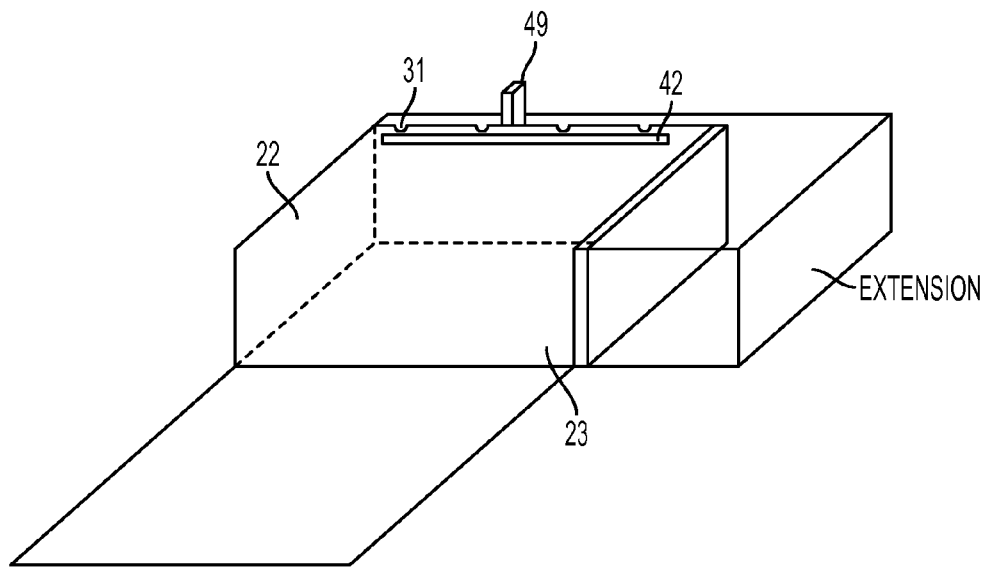
FIGS. 12a and 12b are front perspective views of an extendible apparatus for managing and organizing cables and cords in an open and a closed position according to one embodiment of the invention.
Figure 12B:
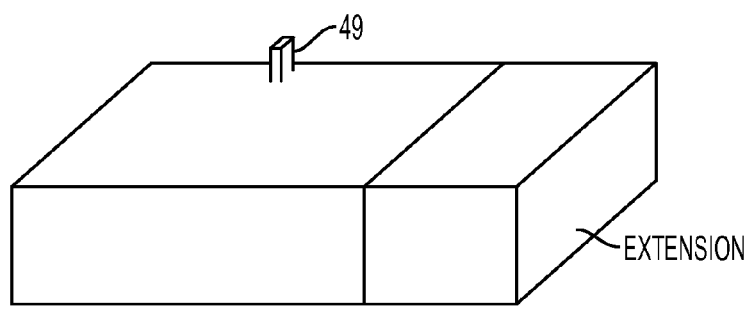

In one embodiment of the invention, as seen in FIGS. 12a and 12b, apparatus 1 can be extended in size to hold electrical devices 3 and 5 of various sizes and shapes.

The invention may be modular in design to accommodate electrical devices and cables and cords of various sizes. For example, one modular section (not shown) may comprise rail 42, conduit 50, inlet port 49 and apertures 31 and may be configured to be mated to apparatus 1 at upper edge 28 of front wall 25. A variety of such modular sections may be provided with varying dimensions to accommodate various incoming cables and cords, and components 6 of cables and cords 2. Similarly, a modular section (not shown) may comprise one or more wrapping system units 30 for placement proximate to ingress and egress slot 26, for example on back wall 27, to wrap cable or cord 24 of electrical devices 3 and 5. Again, a variety of such modular sections may be provided with varying dimensions to accommodate various cables and cords 24 of electrical devices 3 and 5. Such a modular section may be configured to slide over back wall 27 and may comprise one or more wrapping system units 30.

FIGS. 13 through 17 depict a second embodiment of the present invention that is suitable for organizing and concealing for easy transport the various electrical cables and cords of the AC adapter cables and/or peripheral devices (e.g. mouse, keyboard, audio/visual equipment) of a computer. In order that the system and apparatus 101 can be easily stored and carried, for example, in a laptop carrying case, the system and apparatus 101 is comprised of a body 120 that is made of a substantially collapsible and flexible material that encloses the cables or cords 102 by being securely folded around the cables or cords in a closed configuration. For example, the body 120 may be comprised of nylon.

Figure 13:
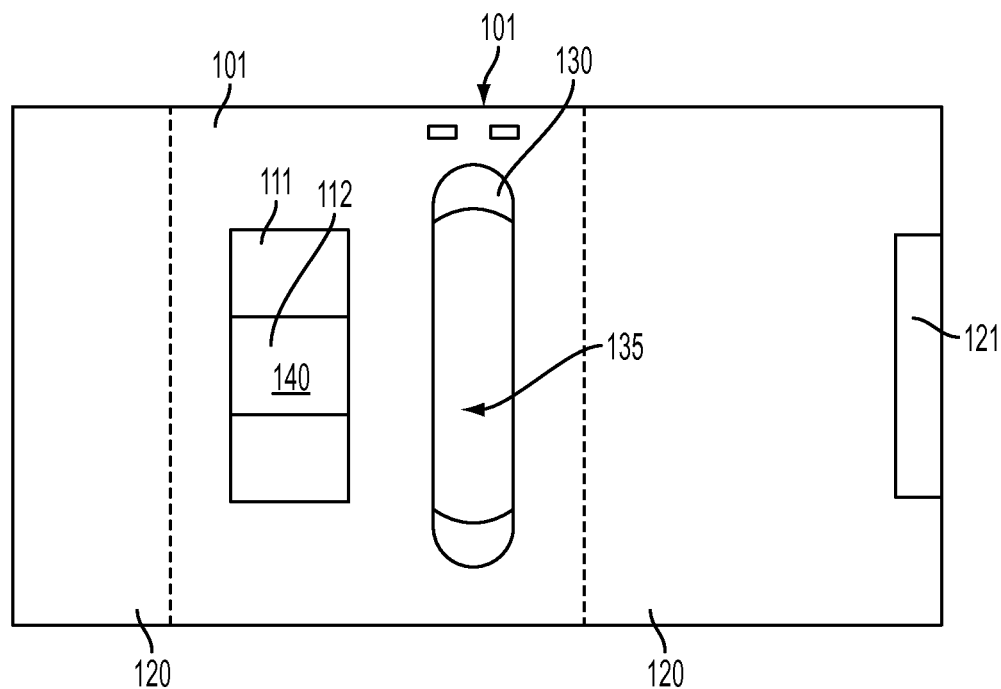

As shown in detail in FIG. 13, the inside surface of body 120 contains a single wrapping system unit 130 that is comprised of a single or multi-level housing 135 that protrudes from and is removably attached to or slidingly engaged with the inside surface of the body 120. Housing 135 may also be made of a flexible material that easily collapses when the system and apparatus 101 is not in use.

In addition, the interior surface of the body 120 of the apparatus 101 can be made of a suitable size and dimension to secure and contain an AC adapter, voltage appliance control, computer peripheral device or other component that is incorporated into or connected to the electrical cables or cords 102. For example, as depicted in FIGS. 13 and 15, the body 120 can include an assigned and separate space 111, such as a compartment or slot 140, in which the AC adapter 103 (as shown in FIG. 15) or other component is captured or contained in place. The incorporation of the compartment or slot 140 may be accomplished using a holding strip or other suitable mechanism 112. For example, the compartment or slot 140 may be delimited by two or more small vertical walls that can accommodate an AC adapter or other component of any length. The small vertical walls may be collapsible or removable in the event that the user does not use the compartment or slot 140 or for accommodating larger AC adapters or other components. Alternatively, a Velcro® strap can be used to secure the AC adapter or other component to the inside surface of the body 120 or corresponding Velcro® patches may be applied to the underside of the AC adapter or other component and the inside surface of the body 120.

In operation, while the apparatus 101 is in an open configuration and the body 120 is in an unfolded position, the AC adapter 103 or other component is placed in its assigned and separate space 111 and is mechanically fastened or secured in place. Thereafter, the one or more electrical cables or cords 102 that originate from or are connected to the AC adapter 103 or other component are manually wrapped around the housing 135 such that the length of the cables or cords 102 may be effectively shortened to a desirable and more manageable length. As mentioned above and as shown in detail in FIG. 16*b*, the housing 135 may contain multiple levels or parts (e.g. 131 and 133) in order that more than one cable or cord 102 can be wrapped around the housing 135. For example, where the apparatus 101 is used to organize and conceal an AC adapter 103, the cord 104 that exits the AC adapter 103 and is intended to be plugged into a power outlet or AC source may be wrapped around the second level or part 131 and the cord 105 that exits the AC adapter 103 and is intended to be connected to the user's computer may be wrapped around the first level or part 133 in order to advantageously keep the two cords separate in order to ensure that they do not become commingled.

Furthermore, the multiple levels or parts of the housing 135 also allow the user to wrap one or more of the cables or cords in an opposite direction (i.e. in a clockwise or counterclockwise direction) from the other cables or cords in order to more easily accommodate the position of the cords or cables as they exit the AC adapter 103 or other component. In addition, the multiple levels or parts of the housing 135 also allow the user to enclose more than one component (e.g. an AC adapter in addition to an USB cable) inside the portable and confined space of the apparatus 101 as each of the several cables or cords 102 can be wrapped around a different level or part of the housing 135. As a result, a convenient mapping system is created whereby a user can easily locate and access a particular electrical cable or cord.

In addition to the wrapping system unit 130, each cable or cord 102 may be further secured to the inside of the body 120 by one or more locking protrusions 132 and 134 that compressively engage the cable or cord 102 and hold it in place prior to and/or after the cable or cord is wrapped around the wrapping system unit 130.

Figure 14:
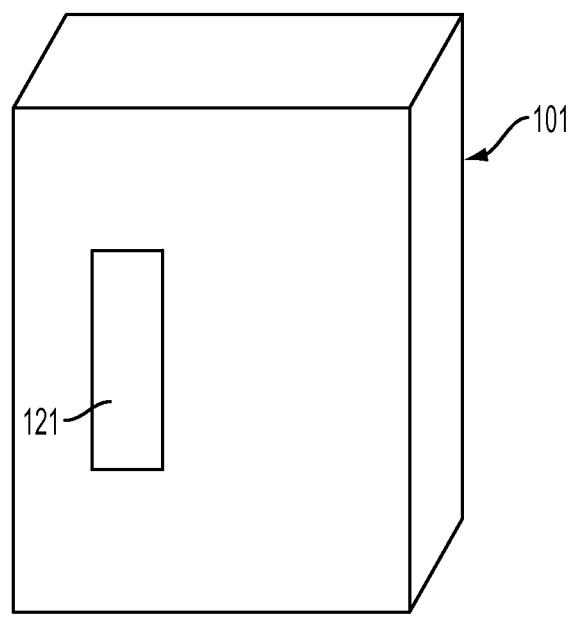
FIGS. 14 and 17 are front perspective views of an apparatus for organizing and concealing for easy transport of the various cables and cords of the AC adapter cables and/or peripheral devices of a computer in its closed position according to one embodiment of the invention.

As shown in detail in FIG. 14, after the one or more electrical cables or cords 102 are wrapped around the wrapping system units 130 to the length desired by the user, the user may fold the apparatus 101 around the cables or cords 102 such that the cables or cords 102 are fully contained within the apparatus 101 and can be easily transported or stored when not in use. A suitable fastening mechanism may be used to keep the apparatus 101 securely closed. For example, the apparatus 101 may be kept closed using corresponding Velcro® patches 121.

Figure 17:
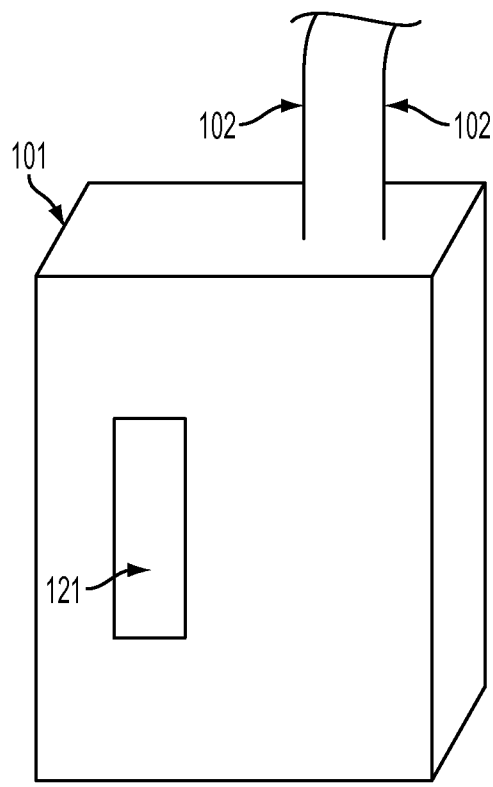

Alternatively, as depicted in FIG. 17 the user may leave a portion of the length of the cables or cords 102 unwrapped prior to folding the apparatus 101 such that the cables or cords 102 may exit the apparatus 101 and be connected to AC power receptacles located in a nearby wall or baseboard or a power strip, surge protector, computer, cable modem, or router, etc. that is not enclosed inside the apparatus 101. Once the user has arranged the cables or cords for the user's particular use, the apparatus 101 is then folded around the cables or cords such that only a portion of the cables or cords is fully contained.

Figure 18A:
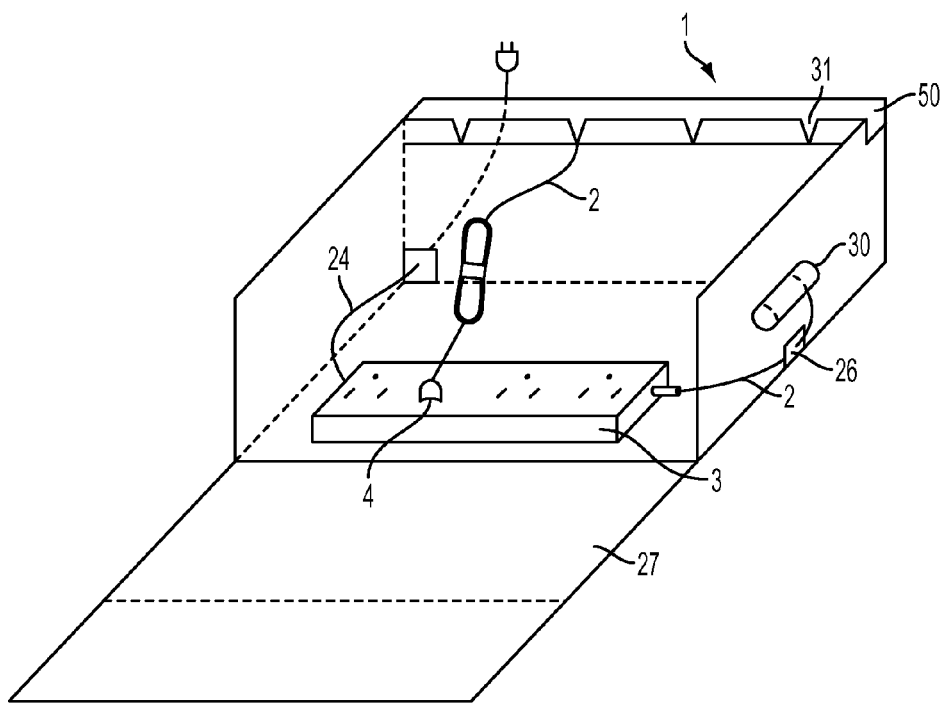
FIG. 18a is a front view of an apparatus for managing and organizing cables and cords in an open position according to one embodiment of the invention.

FIGS. 18-20 depict additional embodiments of a system and apparatus for managing and organizing electrical cords and cables. As seen in FIG. 18*a*, aperture 31 of apparatus may comprise a self-securing V-shaped notch capable of accommodating electrical cords and cables 2 of various widths and diameters. Electrical cord or cable 2 enters apparatus 1 through conduit 50, whereupon it passes through aperture 31. Electrical cord or cable 2 is forced downward into aperture 31 until it is secured. Electrical cord or cable 2 can then be wrapped and secured with, for example, Velcro® or any other method for securing folded cords or cables now known or later developed, without the need for additional system wrapping units before being plugged into electrical device 3 or 5.

Figure 18B:
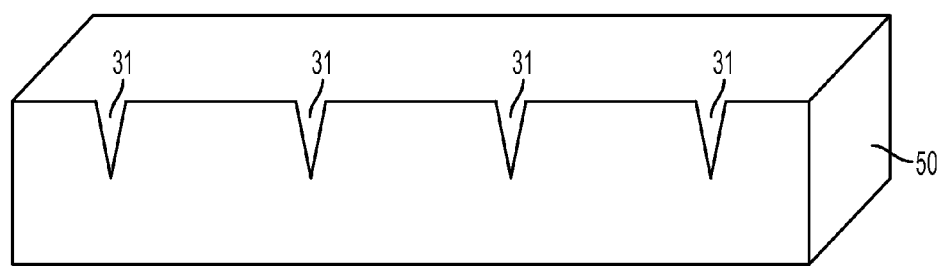
FIG. 18b is a front view of a self-securing aperture for an electrical cord or cable incoming into an apparatus for managing and organizing cables and cords according to one embodiment of the invention.
Figure 18C:
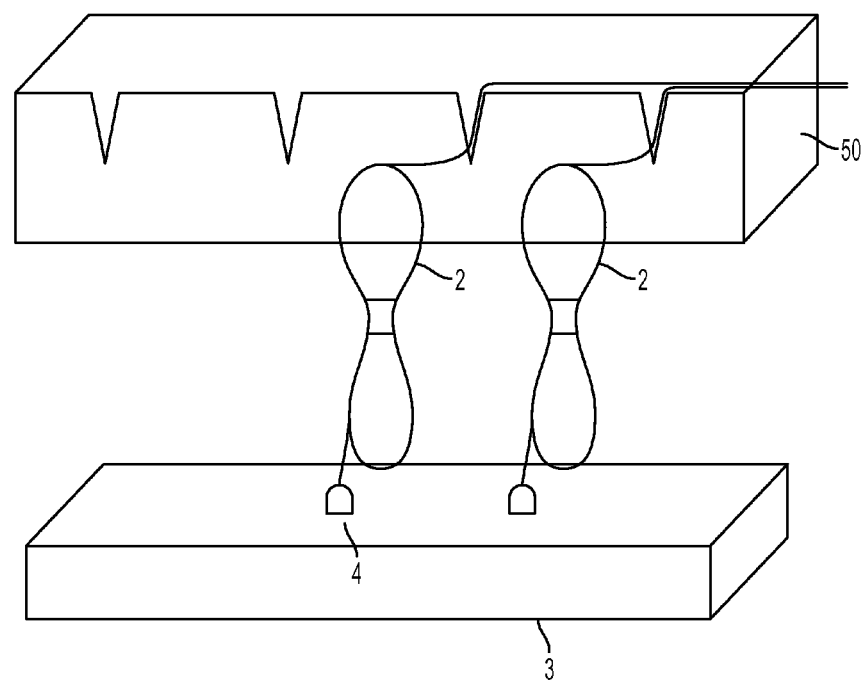
FIG. 18c is a front view of secured electrical cords and cables in an apparatus for managing and organizing cables and cords according to one embodiment of the invention having the self-securing aperture seen in FIG. 18b.

Another view of self-securing aperture 31 is depicted in FIG. 18*b*. FIG. 18*c* depicts electrical cords and cables 2 entering apparatus 1 through conduit 50 and through self-securing apertures 31. Electrical cords and cables 2 are wrapped and secured with hook and loop fasteners such as Velcro®. Plug 4 can then be plugged into electrical device 3 or 5.

Figure 19A:
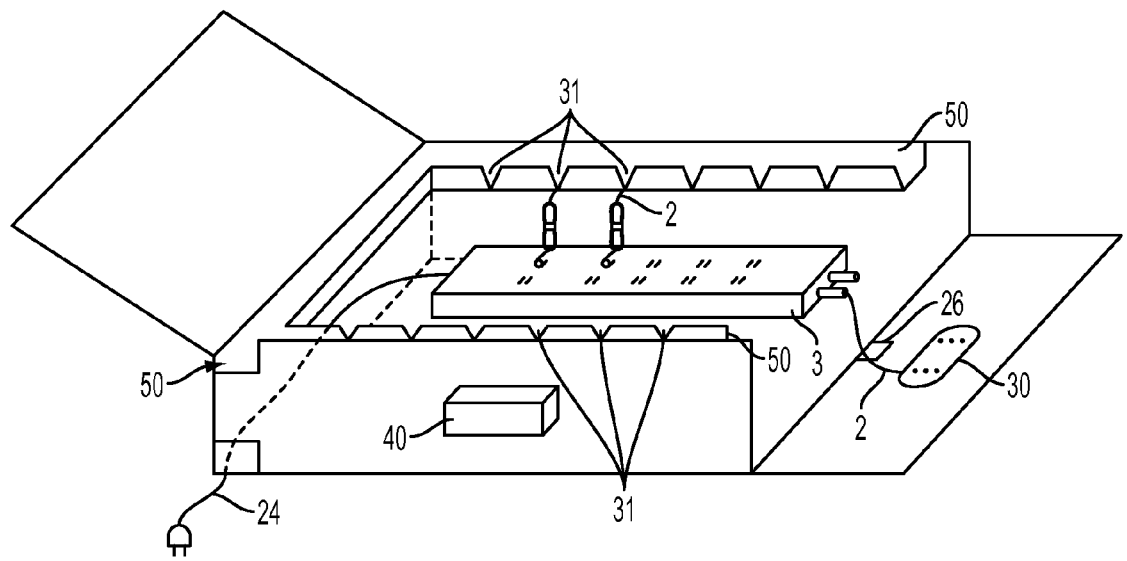
FIG. 19a is a front view of an apparatus for managing and organizing cables and cords having parallel conduits for routing electrical cords and cables into the apparatus in an open position according to one embodiment of the invention.
Figure 19B:
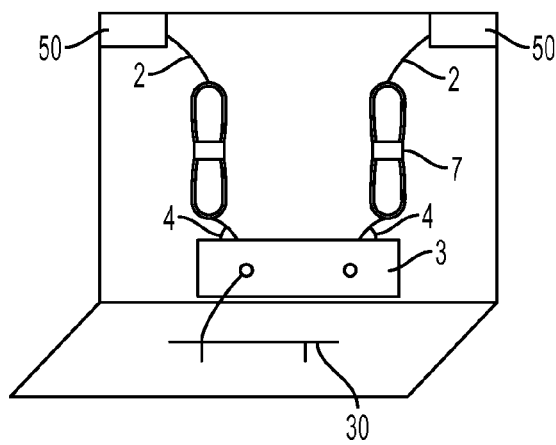
FIG. 19b is a side view of the apparatus of FIG. 19a depicting electrical cords and cables routed into the apparatus through parallel conduits.
Figure 20A:
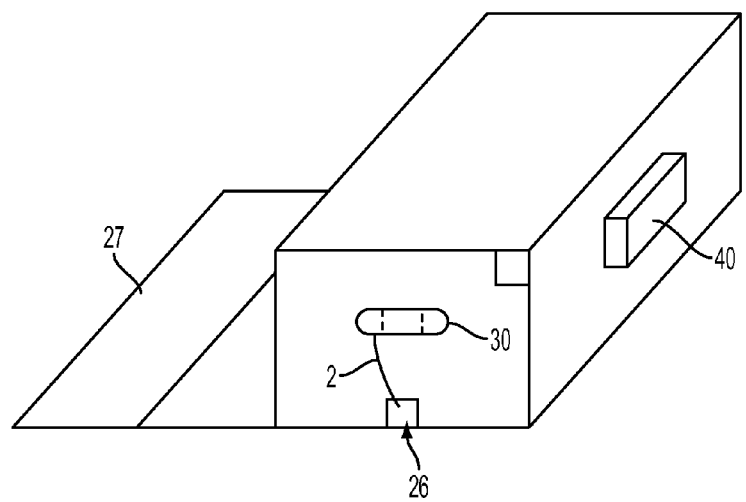
FIG. 20 is a side perspective view of the exterior of an apparatus for managing and organizing cables and cords having an external coaxial cord wrapping system unit according to one embodiment of the invention.
FIG. 20b is a front view of a system wrapping unit for wrapping coaxial cable on the exterior of an apparatus for managing and organizing cables and cords according to one embodiment of the invention.
FIG. 20c is a side view of a system wrapping unit for wrapping coaxial cable on the exterior of an apparatus for managing and organizing cables and cords according to one embodiment of the invention.
FIG. 20d is a side perspective view of the exterior of an apparatus for managing and organizing cables and cords having an external compartment or slot for containing electrical devices such as A/C adaptor fastened to the exterior of the apparatus according to one embodiment of the invention.
Figure 20B:
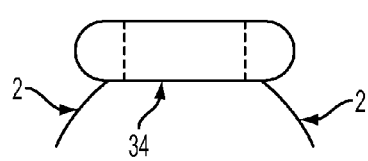
Figure 20C:
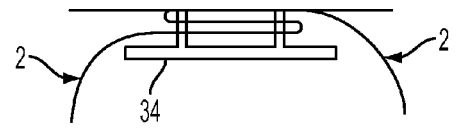
Figure 20D:
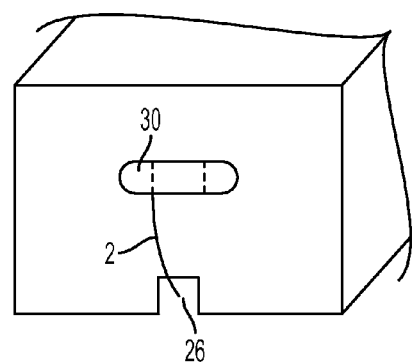

FIG. 19*a* is a front view of an apparatus 1 for managing and organizing cables and cords 2 having parallel conduits 50 for routing electrical cords and cables 2 into the apparatus 1 in an open position according to one embodiment of the invention. Apparatus 1 works as previously described in connection with FIGS. 1, 2, 3 and 18 except that apparatus 1 comprises two parallel conduits 50 and can be sized to accommodate electrical devices 3 and 5 having a plurality of rows of electrical outlets. FIG. 19*b* is a side view of the apparatus 1 of FIG. 19*a* depicting electrical cords and cables 2 routed into the apparatus 1 through parallel conduits 50.

Where desired, certain electrical devices 3 and 5, such as A/C adaptor, and certain electrical cords and cables 2, such as coaxial cable, can be mounted and wrapped external of apparatus 1. FIG. 20*a* depicts a side perspective view of the exterior of apparatus 1 having an external coaxial cable wrapping system unit 30 and external compartment or slot 40 for containing electrical device 3 or 5 according to one embodiment of the invention. Electrical cord or cable 2 can enter apparatus 1 through ingress and egress slot 26 after being wrapped around external system wrapping unit 30 as seen in FIGS. 20*b* and 20*c*. External system wrapping unit 30 may comprise housing 34 substantially similar to that seen in FIGS. 4*a* and 4*b*. Locking protuberances 32 and 33 may also be used in connection with external system wrapping unit 30.

Figure 21A:
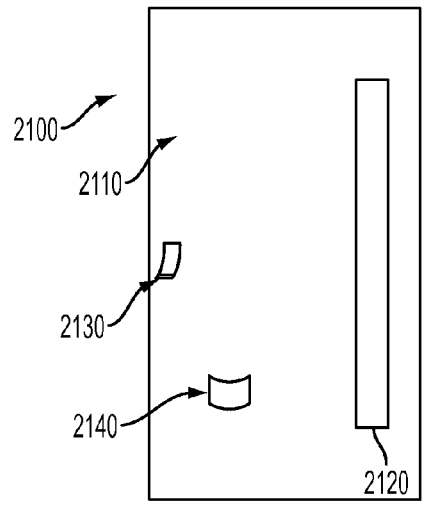
FIGS. 21a and 21b are front views of an electrical cable wrapping device according to one embodiment of the invention.
Figure 21B:
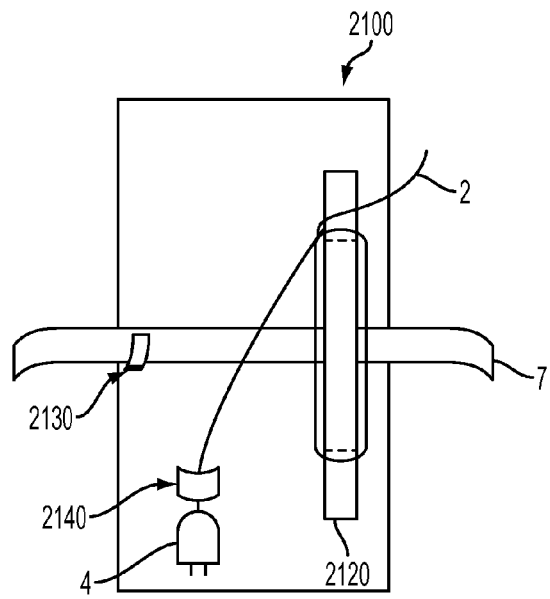
Figure 21C:
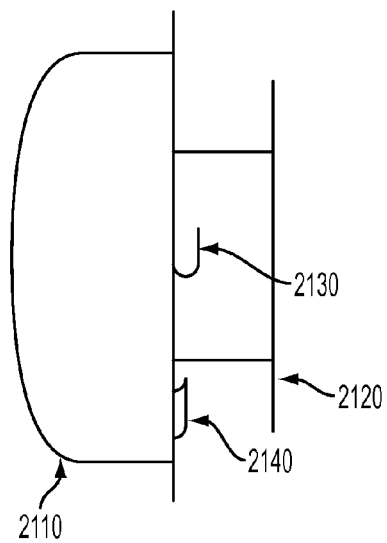
FIG. 21c is a side view of an electrical cable wrapping device according to one embodiment of the invention.

The invention further comprises an electrical cable wrapping device that can be used in connection with apparatus 1. Electrical cable wrapping device 2100 is depicted in FIG. 21*a*-21*c*. FIG. 21*a* depicts a front view of electrical cable wrapping device 8 comprising a handle 2110, a housing 2120, a fastener hook 2130 for securing a fastener such as a hook and loop fastener (e.g., Velcro®) and an electrical cord or cable hook 2140 for securing an electrical cord or cable 2. Housing 2120 protrudes from electrical cable wrapping device 2100 in a manner similar to wrapping system units 30 depicted in FIGS. 4a and 4b. FIG. 21b depicts a side view of electrical cable wrapping device 2100.

Electrical cable wrapping device 2100 operates as follows. A suitable fastener, such as a hook and loop fastener (e.g., Velcro®) is placed across the electrical cable wrapping device 2100 and secured in fastener hook 2130. The end of the electrical cord or cable 2 with plug 4 is secured in electrical cord or cable hook 2140. A user holds electrical cable wrapping device 2100 by handle 2110 in one hand. With the other hand, the user grasps electrical cord or cable 2 and wraps electrical cord or cable 2 around housing 2120. Once electrical cord or cable 2 is wrapped around housing 2120 and sufficient electrical cord or cable 2 is left unwrapped as desired by the user, the user secures wrapped electrical cord or cable 2 with the fastener by removing the end of the fastener from fastener hook 2130 and securing the fastener around electrical cord or cable 2. The wrapped end of electrical cord or cable 2 can then be removed from electrical cord or cable wrapping device 2100 and placed into apparatus 1, for example as seen in FIGS. 18a and 18c.

In the foregoing description, the present invention has been described with reference to specific exemplary embodiments thereof. It will be apparent to those skilled in the art that a person understanding this invention may conceive of changes or other embodiments or variations, which utilize the principles of this invention without departing from the broader spirit and scope of the invention. The specification and drawings are, therefore, to be regarded in an illustrative rather than a restrictive sense. Accordingly, it is not intended that the invention be limited except as may be necessary in view of the appended claims.

I claim:

1. An apparatus for organizing and concealing one or more electrical cables, comprising:
    a body defining an open enclosure for receiving one or more electrical cables into the open enclosure, the body comprising a plurality of side walls having an exterior wall and an interior wall and one or more apertures formed in one or more of the plurality of side walls for receiving the one or more electrical cables into the open enclosure wherein the one or more electrical cables are inserted through the one or more apertures;
    a top cover configured to close the open enclosure of the body such that the one or more electrical cables are substantially concealed from view,
    a rail disposed on an interior wall of a side wall having apertures formed therein; and
    a plurality of restraint units slidingly and releasably engaged with the rail substantially at the locations of each of the apertures whereby an electrical cable inserted through an individual aperture is manually wrapped around a restraint unit to a desired length,
    wherein the open enclosure of the body is configured to receive one or more electrical devices, wherein one or more of the electrical cables are plugged into one or more of the electrical devices,
    wherein further the one or more electrical devices comprise one or more of an AC power strip, a surge protector, a cable modem and a router.

2. The apparatus of claim 1 wherein the apertures comprise a V-shaped notch configured to securely hold the one or more electrical cables.

3. The apparatus of claim 2, further comprising one or more conduits for receiving the electrical cables from the exterior of the apparatus, wherein the electrical cables enter the one or more apertures from one of the conduits.

4. The apparatus of claim 3, further comprising one or more apertures formed in one or more of the plurality of side walls for permitting the one or more electrical cables to exit the open enclosure.

5. The apparatus of claim 4, wherein the electrical cables comprise one or more of electrical cords, telephone cords, coaxial cable or Ethernet cables.

6. The apparatus of claim 4, wherein one or more of the electrical cables or electrical devices are housed external to the apparatus and the cables or cords of the electrical cables or electrical devices enter the apparatus through one or more apertures.

7. The apparatus of claim 1, wherein each restraint unit comprises a hook, a slot, a clip, a vertical loop, a fold comprising a hook and loop fastener or a circular ring.

8. The apparatus of claim 7, further comprising one or more locking protrusions in contact with one or more of the plurality of side walls for further securing the one or more electrical cables into place prior to or after the one or more electrical cables are wrapped around said restraint units.

9. The apparatus of claim 7, further comprising one or more conduits for receiving the electrical cables from the exterior of the apparatus, wherein the electrical cables enter the one or more apertures from one of the conduits.

10. The apparatus of claim 9, further comprising one or more apertures formed in one or more of the plurality of side walls for permitting the one or more electrical cables to exit the open enclosure.

11. The apparatus of claim 10, wherein the electrical cables comprise one or more of electrical cords, telephone cords, coaxial cable or Ethernet cables.

12. The apparatus of claim 10, wherein one or more of the electrical cables or electrical devices are housed external to the apparatus and the cables or cords of the electrical cables or electrical devices enter the apparatus through one or more apertures.

13. The apparatus of claim 9, wherein the restraint unit comprises a hook and a circular ring housing, wherein the circular ring comprises an arm having a lip and the hook comprises a slot configured for releasable engagement of the arm, wherein the hook is further configured to slide over the rail, wherein the circular ring housing further comprises housings that protrude from the circular housing configured for the wrapping of the electrical cables around the housings to shorten the length of the electrical cable.

14. The apparatus of claim 9, wherein the restraint unit comprises a hook and clip housing, wherein the circular ring is attached to the hook and the hook is configured to slide over the rail, wherein an electrical cable is passed through the clip and then wrapped and secured with a hook and loop fastener to shorten the length of the electrical cable.

15. The apparatus of claim 9, wherein the restraint unit comprises a hook and vertical loop housing, wherein the vertical loop ring is attached to the hook and the hook is configured to slide over the rail, wherein the electrical cable is wrapped and fastened with a hook and loop fastener to shorten the length of the electrical cable, wherein the wrapped and fastened electrical cable is hung over the vertical loop.

* * * * *